United States Patent
Gates et al.

(10) Patent No.: US 11,801,793 B1
(45) Date of Patent: Oct. 31, 2023

(54) DIRECTIONALLY ADJUSTABLE MOUNTING SYSTEM AND RELATED METHODS

(71) Applicant: All Rite Products, Inc., Riverton, UT (US)

(72) Inventors: Travis D. Gates, Riverton, UT (US); Stacey L. Gates, Riverton, UT (US); Jason Tubbs, North Ogden, UT (US)

(73) Assignee: All Rite Products, Inc., Riverton, UT (US)

( * ) Notice: Subject to any disclaimer, the term of this patent is extended or adjusted under 35 U.S.C. 154(b) by 0 days.

(21) Appl. No.: 17/858,798

(22) Filed: Jul. 6, 2022

(51) Int. Cl.
*B60R 11/00* (2006.01)
*F16M 13/02* (2006.01)

(52) U.S. Cl.
CPC ....... *B60R 11/00* (2013.01); *B60R 2011/0052* (2013.01); *B60R 2011/0084* (2013.01); *B60R 2011/0085* (2013.01); *F16M 13/022* (2013.01)

(58) Field of Classification Search
CPC ..... B60R 2011/0084; B60R 2011/0085; B60R 2011/008; F16M 13/022
USPC ....... 224/401, 545; 248/296.1, 274.1, 288.11
See application file for complete search history.

(56) References Cited

U.S. PATENT DOCUMENTS

| | | | |
|---|---|---|---|
| 4,547,092 A * | 10/1985 | Vetter | F16B 2/04 248/229.11 |
| 6,619,872 B2 * | 9/2003 | Crorey | B25J 15/0061 403/54 |
| 7,100,808 B2 * | 9/2006 | Hancock | F16L 3/10 224/567 |
| 7,829,775 B2 * | 11/2010 | Morrow | A47F 7/00 84/327 |
| 8,146,879 B2 * | 4/2012 | Liao | A45B 11/00 248/278.1 |
| 8,534,519 B2 * | 9/2013 | Hancock | B62J 7/08 224/558 |
| 10,100,975 B2 * | 10/2018 | Chen | B62J 15/02 |
| 10,982,731 B2 * | 4/2021 | Hancock | F16M 13/022 |
| 11,608,011 B2 * | 3/2023 | Winkler | B60R 11/06 |
| 2009/0282963 A1 * | 11/2009 | Morrow | A47F 7/00 84/290 |

(Continued)

OTHER PUBLICATIONS

Kolpin Outdoors Inc., Ratcheting Rhino Grip, Product Instructions, 2017, 2 pages, Plymouth Minnesota.

(Continued)

*Primary Examiner* — Justin M Larson
(74) *Attorney, Agent, or Firm* — Jason R. Jones (57) ABSTRACT

A system is provided for positioning and securing one or more article holders to a vehicle, the system including a base, removably coupleable to a component of a vehicle, carrying one or more base rotational interlock features. A rotationally adjustable dial carries one or more dial rotational interlock features and one or more dial translational interlock features. The rotationally adjustable dial can be restrained by the collective rotational interlock features from rotational movement relative to the base. An article holder support carries one or more support translational interlock features and includes an attachment interface for an article holder. The article holder support is thereby translationally adjustable within the dial translational interlock feature but is restrained from rotational movement relative to the base.

19 Claims, 5 Drawing Sheets (56) References Cited

U.S. PATENT DOCUMENTS

2013/0014420 A1* 1/2013 Bastian, Jr. ............. F41A 23/02
42/94

OTHER PUBLICATIONS

Kolpin Outdoors Inc., Rhino Grip XLR, Product Instructions, 2017, 2 pages, Plymouth Minnesota.
Kolpin Outdoors Inc., Rhino Grip Double, Product Instructions, 2017, 2 pages, Plymouth Minnesota.

* cited by examiner

DIRECTIONALLY ADJUSTABLE MOUNTING SYSTEM AND RELATED METHODS

BACKGROUND OF THE INVENTION

Field of the Invention

The present invention relates generally to systems for mounting various auxiliary items to a base structure, such as an ATV, UTV, land-based vehicle, watercraft, and the like.

Related Art

Holding devices, or article holders, for use on vehicles have been utilized for many years to allow operators of the vehicles to carry various articles on the vehicle. For example, article holders such as those disclosed in U.S. Pat. No. 4,607,772 have been used to carry hunting and fishing equipment, tools, etc., on motorcycles, snowmobiles, ATVs, UTVs, side-by-side vehicles, bicycles, all-terrain vehicles and other vehicles (collectively referred to herein as "vehicles"). While most such devices perform their function well, the area typically available on the handlebars, roll cage bar, storage racks, etc., of such vehicles is often limited. Thus, while the article holders may function well to hold an article, securing the article holders in a convenient location upon an ATV can often be challenging.

SUMMARY OF THE INVENTION

In accordance with one aspect of the invention, a system is provided for positioning and securing one or more article holders to a vehicle. The system can include a base, removably coupleable to a component of a vehicle. The base can carry one or more base rotational interlock features. A rotationally adjustable dial can carry one or more dial rotational interlock features, and one or more dial translational interlock features. The rotationally adjustable dial can thereby be restrained by the collective rotational interlock features from rotational movement relative to the base. An article holder support can carry one or more support translational interlock features, the article holder support including an attachment interface for an article holder. The article holder support can thereby be adjustably restrained from rotational and translational movement relative to the base.

In accordance with another aspect of the technology, a system can be provided for positioning and securing one or more article holders to a vehicle. The system can include a base, removably coupleable to a component of a vehicle. One or more teeth can be carried by the base and can extend radially outward from a core of the base. A rotationally adjustable dial can carry one or more recesses formed internally within a bore of the dial, and a slot formed in an upper portion of the dial. The rotationally adjustable dial can be restrained by the teeth and the slots from rotational movement relative to the base. An article holder support can have an elongate cross section sized and shaped to fit within the slot of the dial, the article holder support including an attachment interface for an article holder. The article holder support can thereby be translationally adjustable within the dial translational interlock feature but is thereby restrained from rotational movement relative to the base.

In accordance with another aspect of the technology, a method is provided of positioning and securing a pair of article holders to a vehicle. The method can include removably coupling a first base to a component of a vehicle. A second base can be removably coupled to the same or a different component of the vehicle. The method can include rotationally adjusting a first adjustable dial of the first base relative to the vehicle and rotationally adjusting a second adjustable dial of the second base relative to the vehicle. A first article holder support can be translationally adjusted relative to the first base and a second article holder support can be translationally adjusted relative to the second base.

BRIEF DESCRIPTION OF THE DRAWINGS

The following drawings illustrate exemplary embodiments for carrying out the invention. Like reference numerals refer to like parts in different views or embodiments of the present invention in the drawings.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Definitions

As used herein, the singular forms "a" and "the" can include plural referents unless the context clearly dictates otherwise. Thus, for example, reference to a "component of a vehicle" can include one or more of such components, if the context dictates.

As used herein, the term "substantially" refers to the complete or nearly complete extent or degree of an action, characteristic, property, state, structure, item, or result. As an arbitrary example, an object that is "substantially" enclosed is an article that is either completely enclosed or nearly completely enclosed. The exact allowable degree of deviation from absolute completeness may in some cases depend upon the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. As another arbitrary example, a composition that is "substantially free of" an ingredient or element may still actually contain such item so long as there is no measurable effect as a result thereof.

As used herein, the term "about" is used to provide flexibility to a numerical range endpoint by providing that a given value may be "a little above" or "a little below" the endpoint.

Relative directional terms can sometimes be used herein to describe and claim various components of the present invention. Such terms include, without limitation, "lower," "higher," "upward," "downward," "horizontal," "vertical," etc. These terms are generally not intended to be limiting, but are used to most clearly describe and claim the various features of the invention. Where such terms must carry some limitation, they are intended to be limited to usage commonly known and understood by those of ordinary skill in the art in the context of this disclosure.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Invention

The present technology relates generally to attachment systems that allow selective positioning and securing of one or more article holders to a vehicle. The article holders can hold a variety of items, such as weapons, tools, fishing gear, etc., and can be attached to a variety of vehicles, or components or parts of vehicles, including without limitation ATVs, UTVs, bicycles, automobiles, trucks, marine vessels and the like. Such articles holders are well known, and have performed their function admirably for many years. They are generally coupled to handlebars, roll cage bars, storage racks, etc., of such vehicles and allow a user to transport a variety of items on the vehicle.

While such holders and their use on vehicles in known, those of ordinary skill in the art appreciate that the area available on many vehicles to attach such holders is often limited. For example, many handlebars on motorcycles or ATVs are already crowded with a variety of equipment or cables. Thus, even if a user can make use of an available space on a handlebar to install an article holder, the available position may not allow the user to utilize the article holder for the purpose he or she desires, as using that location may result in whatever article he wishes to carry on the vehicle to be positioned or oriented in a disadvantageous arrangement. In addition, oftentimes two such article holders are utilized for longer tools, rifles, fishing poles, etc. In this case, the problems associated with locating sufficient "real estate" to mount two holders, and be able to orient such holders to align with one another to properly position a long tool is even more difficult.

Figure 4:
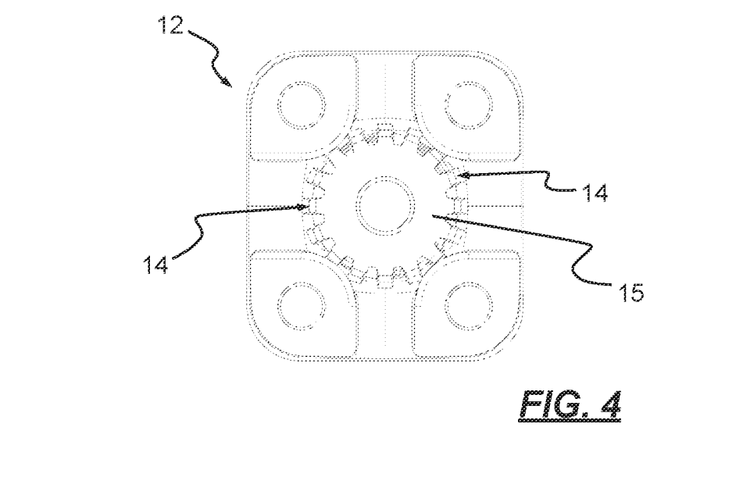
FIG. 4 is a top view of the base of FIG. 3.
Figure 5:
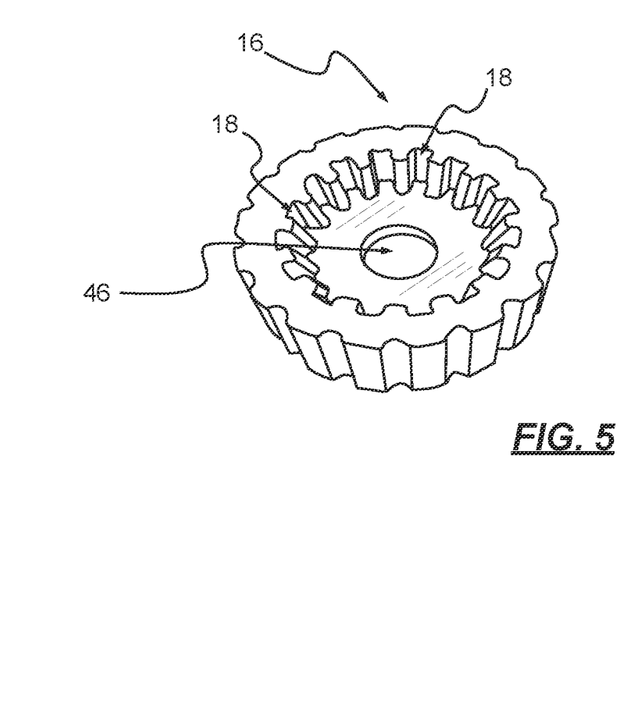
FIG. 5 is a bottom, perspective view of an adjustable dial in accordance with an aspect of the technology.

The present technology provides systems and methods that provide much more flexibility in positioning article holders for any desired application. The figures generally illustrate a system 10 that can include a base 12 that can be removably coupleable to a component (shown by example at 40 in FIG. 6) of a vehicle (not shown in detail). The base 12 can include or can carry one or more base rotational interlock features 14 (shown in more detail in FIGS. 2 and 4). The system can also include a rotationally adjustable dial 16 that can include or carry one or more dial rotational interlock features 18 (FIG. 5). When positioned, as discussed in more detail below, the rotationally adjustable dial can be restrained from rotational movement relative to the base by the collective rotational interlock features 14, 18.

The dial 16 can include one or more dial translational interlock features 20. An article holder support 22 can carry one or more support translational interlock features 24 (see FIG. 2, for example). The article holder support 22 can include an attachment interface 26 for an article holder (two of which are shown by example at 28a, 28b in FIG. 6). In this manner, the collective translational interlock features 20, 24 can allow the article holder support 22 to be selectively slidably adjustable relative to the dial 16. In one embodiment, the attachment interface 26 can provide rotational adjustment of the article holder relative to the article holder support. For example, the article holder can be threadably engaged with attachment interface 26 and selectively locked in place with a nut, which allows controlled rotational adjustment of the holder relative to the article holder support 22.

The system thus allows one or more article holders 28 to be attached to, and selectively positioned relative to, a component 40 of a vehicle (not shown). The system advantageously allows adjustment of the article holders relative to both translational axes, and also rotationally relative to the component.

Figure 1:
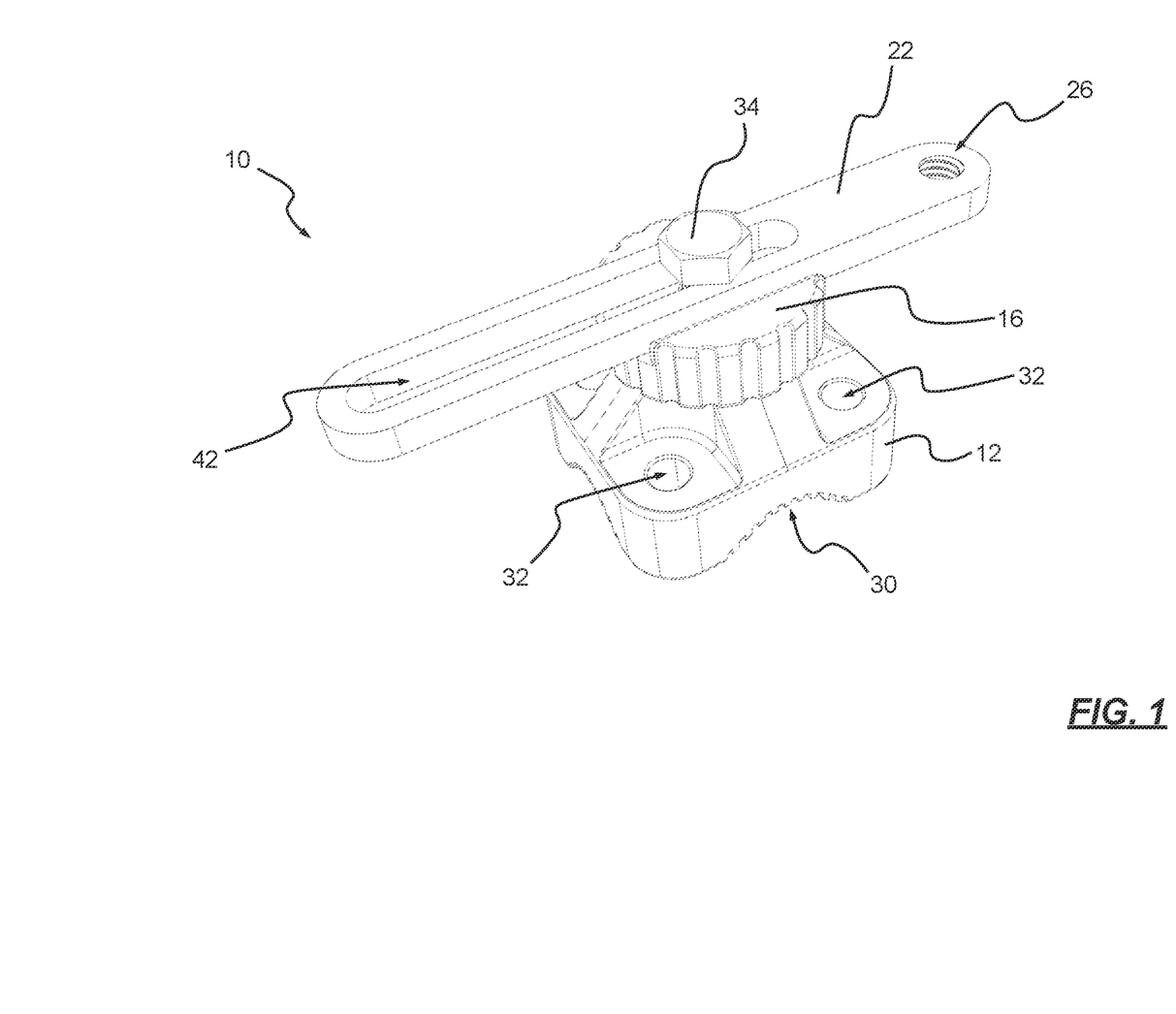
FIG. 1 is a perspective view of a system for positioning and securing one or more article holders to a vehicle in accordance with an aspect of the technology.
Figure 2:
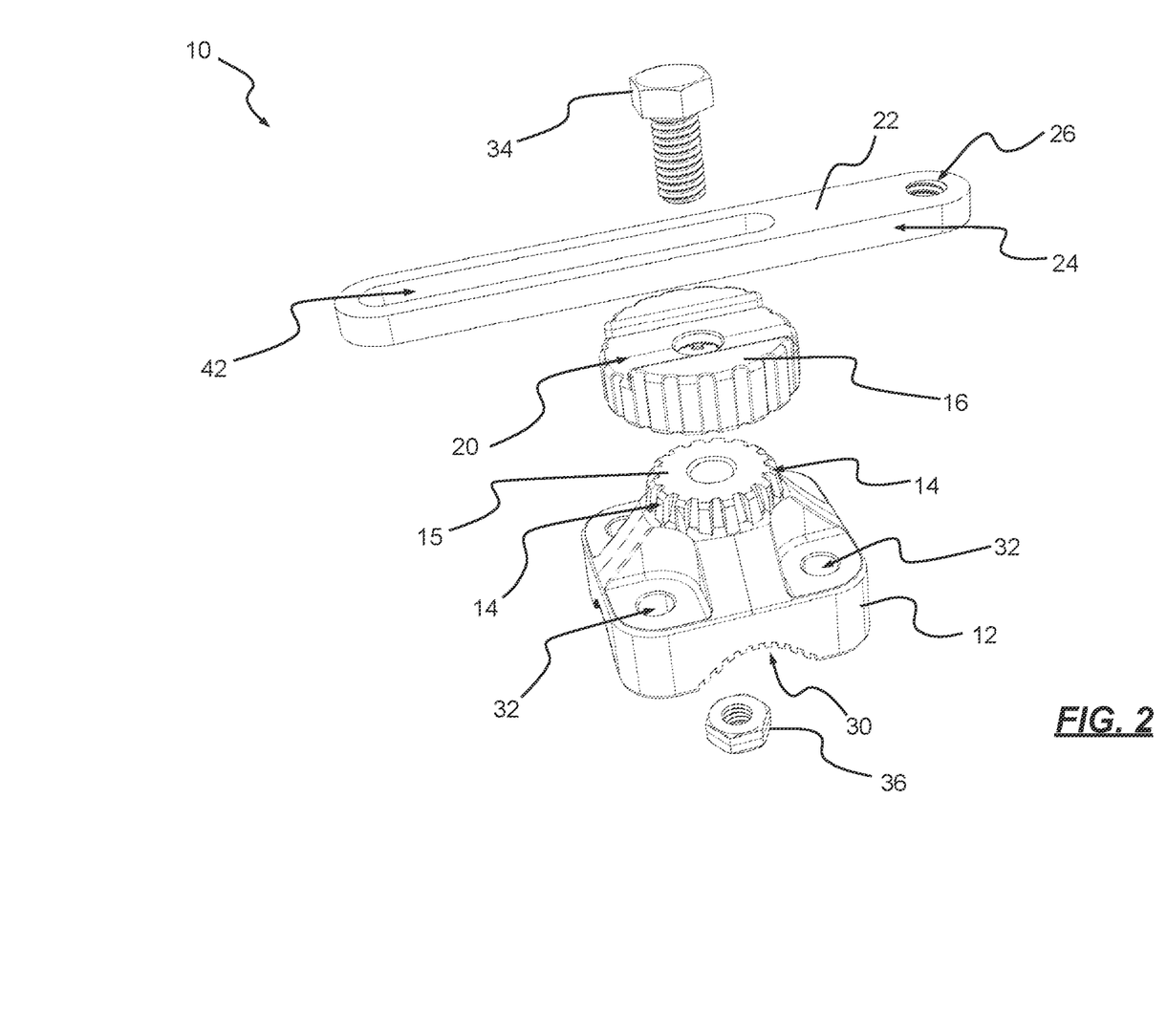
FIG. 2 is a perspective, exploded view of the system of FIG. 1.
Figure 3:
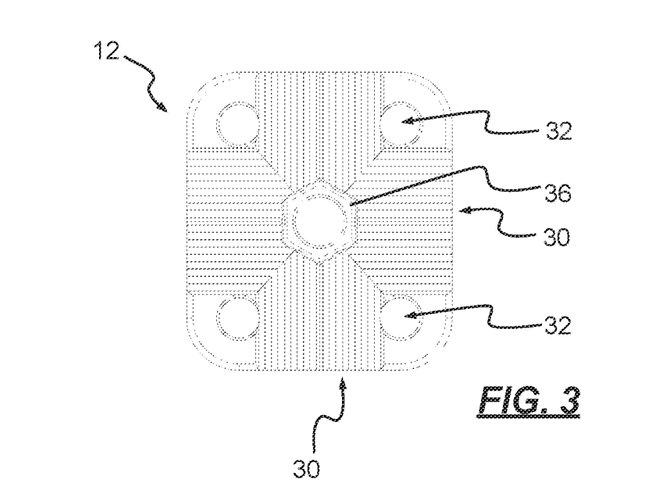
FIG. 3 is a bottom view of a base removably coupleable to a component of a vehicle in accordance with an aspect of the technology.
Figure 6:
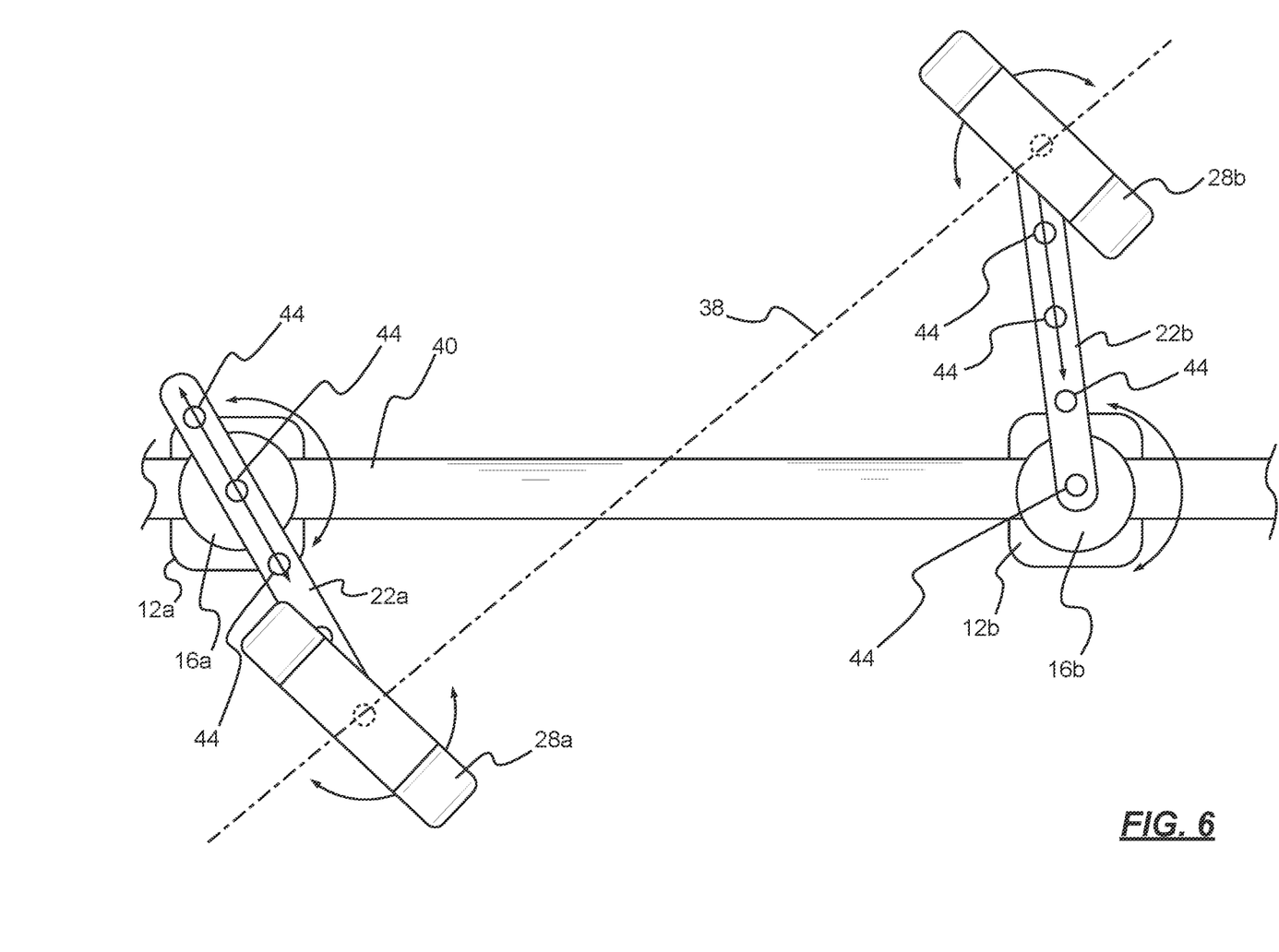
FIG. 6 is a top, schematic representation of a pair of article holders attached to a vehicle component in accordance with an embodiment of the technology.

Thus, for example, as shown schematically in top view in FIG. 6, base 12a and 12b are each attached at different locations along vehicle component 40. The bases can be attached in a variety of manners, known in the art. The bases can each include, for example, a series of ridges or teeth 30, as illustrated in FIGS. 1, 2 and 3. These ridges can aid in securing the bases to a rounded component 40. A pair of U-bolts (not shown), can be attached through openings 32, for example, to securely clamp the bases to the vehicle component, as is known in conventional systems.

Once securely clamped to the vehicle component 40, the directional dials 16a, 16 can be installed atop the respective bases 12a, 12b. While the respective rotational interlock features 14, 18, can function in a variety of manners, in one example the directional dial can be slid down over the base in a particular orientation: when slid down upon the base, it cannot rotate. If a different orientation is desired, the directional dial can be lifted slightly, rotated and again slid down atop the base to achieve the desired orientation. Once secured atop the base, however, the directional dial is prevented from rotating relative to the base.

Each directional dial 16a, 16b, can include a corresponding article holder support 22a, 22b. Each of these is restrained from rotating relative to its respective base by the respective translational interlock features 22, 24. Each of these is also selectively adjustable translationally relative to its respective directional dial. In one example, the entire assembly can be secured to prevent movement of the components via fasteners 34 and 36 (FIGS. 1 and 2). In this example, fastener 34 comprises a bolt that extends through the base 12 and fastener 36 comprises a nut that can be secured within the base. Once all components of the system are positioned where desired, the bolt 34 can be securely cinched to nut 36, and all components are thereby restrained from movement. As shown in FIG. 3, the nut 36 can be received within the base in a channel shaped as the outside of the nut is shaped. This allows the nut to slide into and out of the base, but restrains the nut from turning during tightening.

The system thus allows adjustment of the article holders 28a, 28b in a great deal of variations. For example, each holder can be translationally adjusted to a different translational distance relative to the vehicle or vehicle component than a translational distance of the second article holder support. In the example shown, holder 28b is adjusted to a greater length from the component than is holder 28a. In this manner, for example, holder 28a can be adjusted to a first side of the component of the vehicle and the article holder support 28b can extend to an opposing, second side of the component of the vehicle. In addition, each holder 28a, 28b can be adjusted to a different rotational orientation relative to the component 40. In this example, the angle formed between article holder support 22a relative to the component is less than the angle formed between article holder support 22b.

This great flexibility in adjustment allows one or more article holders 28a, 28b, etc., to be used to hold a variety of articles securely and safely upon a vehicle. For example, the arrangement shown in FIG. 6 allows an area 38 to be defined in which an elongate article, such as a rifle, shotgun, fishing pole, shovel handle, etc. can be carried upon the vehicle, while still allowing an operator to safely drive the vehicle. Even very small adjustments of angle and length can be achieved with the present system to provide the optimal storage location for any particular vehicle, and/or component upon the vehicle.

Returning to FIGS. 2 and 4, the base rotational interlock features 14 can take a variety of forms. In the examples shown, they include a series of teeth extending radially outward from a core 15 of the base 12. They thus provide a generally pyramidal profile. In this example, the rotational interlock features 18 (FIG. 5) of the dial 16 include a series of recesses formed internally within a bore of the dial. The respective rotational interlock features cooperatively provide a manner by which rotational movement of the dial 16 relative to the base 12 can be controlled. In some embodiments, the amount of adjustability provided is in discrete increments. In one example, there are around sixteen teeth extending from the base, and about sixteen corresponding recesses formed in the dial. This provides rotational increments of about 22.5 degrees with each change in position of the dial relative to the base.

The relationship shown allows the dial 16 to slidably engage atop the core 15 of the base 12. In addition to these specific examples, the respective rotational interlock features 14, 18 can include posts, pins, threads, a single slot formed in one of the base or the dial corresponding to multiple pins or extrusions in the base (or vice-versa), and the like.

In the embodiments shown in the figures, the dial translational interlock feature includes at least one recessed slot formed in an upper portion of the dial 16. In this case, the article holder support translational interlock feature 24 includes an elongate cross section shaped to fit snugly within the recessed slot of the dial. This allows the article holder support 22 to slide within the slot, but not rotate relative to the dial. In the embodiment shown in FIGS. 1 and 2, the bolt 34 extends through an elongate slot 42 within the article holder support that allows the support to be adjusted to a desired location, and then cinched into engagement with the dial. In the example shown in FIG. 6, the article holder support includes a series of discrete through-holes 44 that receive the bolt 34 therethrough.

Figure 7:
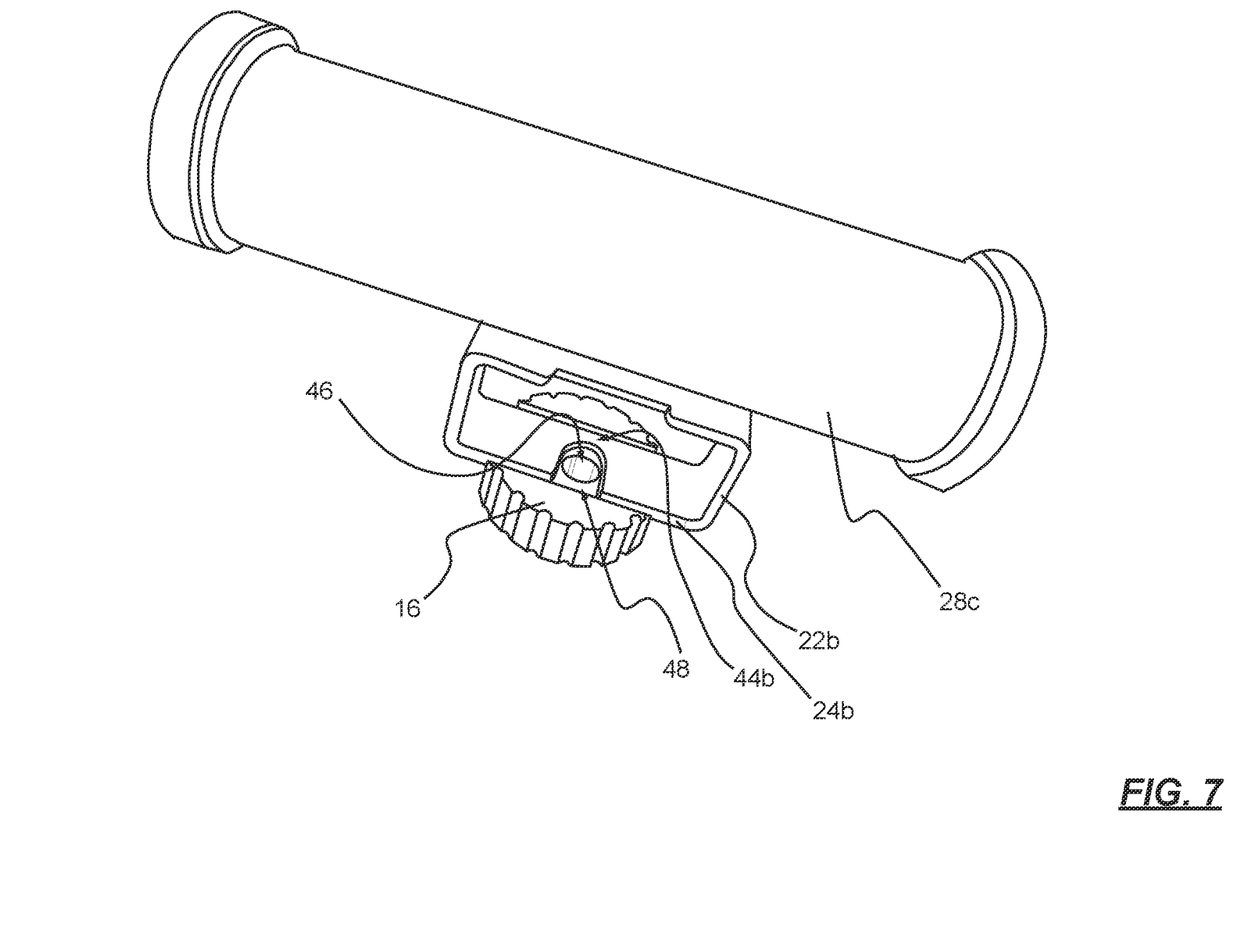
FIG. 7 is a perspective view of another article holder positioned relative to an adjustable dial in accordance with an embodiment of the technology.

FIG. 7 illustrates a further embodiment of the technology in which an article holder 28c includes an article holder support 22b that can carry one or more support translational interlock features 24b. In this example, the translational interlock feature 24b includes a bar having a cross section roughly corresponding to that of the slot (see in FIG. 2, for example) formed within the directional dial 16. Thus, as in previous embodiments the article holder support can be slidably positionable within the slot but, once positioned in the slot, is prevented from rotating relative to the dial 16 (and thus relative to a base, not shown, to which the dial is attached).

In this example, the article holder support 22b is permanently affixed beneath the article holder 28c by way of rivets, bolts, welds, etc. (not shown). The article holder support generally defines a cage within which a fastener (similar to 34 in FIG. 2, but not shown in this view in the interest of clarity) can reside when positioned through an opening or through-hole 24b in the article holder support and opening 46 extending through the dial 16. As that fastener may extend some distance above the dial when first introduced through the opening 24b in the article holder support, the geometry of the cage or the article holder may otherwise interfere with inserting and securing such fastener. In this case, however, the through-hole or opening 24b includes a slot or opening 48 formed in a side thereof. This slot or opening allows the bar or cage of the article holder support 22b to be positioned laterally over any fastener 34 inserted through opening 46 of the dial 16.

In this manner, the present system provides a manner of securely receiving the article holder support 22b within the slot 20 of the directional dial without requiring that the directional dial be removed from or readjusted relative to a base 12 atop which the directional dial is attached. Assuming a fastener 34 were positioned through opening 46 shown in FIG. 7 (omitted from this view for clarity), the article holder support 22b can be lifted slightly relative to the dial 16 and slid backwardly to thereby disengage it from the fastener. Once the fastener is cinched atop the article holder support, however, the article holder support, and thus the article holder 28c is prevented by the slot in the dial from rotating relative to the dial or base or component upon which the base is attached.

In addition to the structure outlined above, the present technology also provides various methods of utilizing, positioning, attaching and detaching, etc., article holders relative to a vehicle. In one example, a method is provided of positioning and securing a pair of article holders to a vehicle. The method can include removably coupling a first base to a component of a vehicle and removably coupling a second base to the same or a different component of the vehicle. A first adjustable dial of the first base can be rotationally adjusting a relative to the vehicle. A second adjustable dial of the second base can be rotationally adjusted relative to the vehicle. A first article holder support can be translationally adjusted relative to the first base, and a second article holder support can be translationally adjusted relative to the second base.

Adjusting the first and second adjustable dials can include rotationally adjusting each in fixed increments of about 22.5 degrees. Rotationally adjusting the first and second adjustable dials relative to the vehicle can include rotationally adjusting the first dial to a different angle relative to the vehicle than an angle of the second dial. Translationally adjusting the first and second article holder supports can include adjusting the first article holder support to a different translational distance relative to the vehicle than a translational distance of the second article holder support. The first article holder support can extend to a first side of the component of the vehicle and the second article holder support can extend to an opposing, second side of the component of the vehicle.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the examples.

I claim:

1. A system for positioning and securing one or more article holders to a vehicle, comprising:
    a base, removably coupleable to a component of a vehicle;
    one or more base rotational interlock features, carried by the base;
    a rotationally adjustable dial carrying:
        one or more dial rotational interlock features;
        the rotationally adjustable dial being restrained by the collective rotational interlock features from rotational movement relative to the base;
        one or more dial translational interlock features; and
    an article holder support carrying one or more support translational interlock features, the article holder support including an attachment interface for an article holder, the article holder support being translationally adjustable within the dial translational interlock feature but being restrained thereby from rotational and movement relative to the base.

2. The system of claim 1, wherein the base rotational interlock features include a series of teeth extending radially outward from a core of the base.

3. The system of claim 2, wherein the dial rotational interlock features include a series of recesses formed internally within a bore of the dial.

4. The system of claim 3, wherein the bore of the dial is slidably engageable over the core of the base.

5. The system of claim 3, wherein a number of teeth extending outwardly from the core of the base correspond to a number of recesses of the dial.

6. The system of claim 5, wherein the base includes sixteen teeth, each providing a rotational adjustment of about 22.5 degrees.

7. The system of claim 1, wherein the dial translational interlock features include at least one recessed slot formed in an upper portion of the dial.

8. The system of claim 7, wherein the article holder support translational interlock features include an elongate cross section shaped to fit within the recessed slot of the dial.

9. The system of claim 1, wherein the attachment interface for the article holder of the article holder support allows rotational adjustment of the article holder relative to the article holder support.

10. A system for positioning and securing one or more article holders to a vehicle, comprising:
    a base, removably coupleable to a component of a vehicle;
    one or more teeth carried by the base and extending radially outward from a core of the base;
    a rotationally adjustable dial carrying:
        one or more recesses formed internally within a bore of the dial; and
        a slot formed in an upper portion of the dial;
        the rotationally adjustable dial being restrained by the teeth of the base and the recesses of the dial from rotational movement relative to the base; and
    an article holder support having an elongate cross section sized and shaped to fit within the slot of the dial, the article holder support including an attachment interface for an article holder, the article holder support being translationally adjustably within the slot while being restrained thereby from rotational movement relative to the base.

11. The system of claim 10, wherein the bore of the dial is slidably engageable over the core of the base.

12. The system of claim 10, wherein a number of teeth of the base correspond to a number of recesses of the dial.

13. The system of claim 12, wherein the base includes sixteen teeth, each providing a rotational adjustment of about 22.5 degrees.

14. The system of claim 10, wherein the attachment interface for the article holder of the article holder support allows rotational adjustment of the article holder relative to the article holder support.

15. A method of positioning and securing a pair of article holders to a vehicle, comprising:
    removably coupling a first base to a component of a vehicle;
    removably coupling a second base to the same or a different component of the vehicle;
    rotationally adjusting a first adjustable dial of the first base relative to the vehicle;
    rotationally adjusting a second adjustable dial of the second base relative to the vehicle;
    translationally adjusting a first article holder support relative to the first base; and
    translationally adjusting a second article holder support relative to the second base.

16. The method of claim 15, wherein rotationally adjusting the first and second adjustable dials comprises rotationally adjusting each in fixed increments of about 22.5 degrees.

17. The method of claim 15, wherein rotationally adjusting the first and second adjustable dials relative to the vehicle includes rotationally adjusting the first dial to a different angle relative to the vehicle than an angle of the second dial.

18. The method of claim 15, wherein translationally adjusting the first and second article holder supports includes adjusting the first article holder support to a different translational distance relative to the vehicle than a translational distance of the second article holder support.

19. The method of claim 18, wherein the first article holder support extends to a first side of the component of the vehicle and wherein the second article holder support extends to an opposing, second side of the component of the vehicle.

\* \* \* \* \*